(12) United States Patent
Simon et al.

(10) Patent No.: US 6,600,427 B2
(45) Date of Patent: Jul. 29, 2003

(54) COMBINATION INSTRUMENT FOR DISPLAYING MEASURED VALUES AND/OR OTHER INFORMATION, IN PARTICULAR FOR USE IN A MOTOR VEHICLE

(75) Inventors: Ernst-Ulrich Simon, Oberursel (DE); Hans Kolibius, Babenhausen (DE); Stephan Zech, Eltville am Rhein (DE); Hartmut Kronenberg, Butjadingen (DE)

(73) Assignee: Mannesmann VDO AG, Frankfurt (DE)

( * ) Notice: Subject to any disclaimer, the term of this patent is extended or adjusted under 35 U.S.C. 154(b) by 219 days.

(21) Appl. No.: 09/877,693

(22) Filed: Jun. 8, 2001

(65) Prior Publication Data

US 2002/0024799 A1 Feb. 28, 2002

(30) Foreign Application Priority Data

Jun. 16, 2000 (DE) .......................... 100 29 729

(51) Int. Cl.⁷ .............................. G08B 5/36; H05K 5/00
(52) U.S. Cl. ......................... 340/815.49; 340/815.45; 340/815.78; 340/525; 361/749; 361/752; 361/759; 362/23; 362/28; 362/800; 116/47; 116/49; 257/713
(58) Field of Search ............... 340/815.4, 815.41, 340/815.47, 815.49, 815.73, 815.78, 525; 362/23, 28, 580, 547, 800; 361/749, 752, 750, 751, 759; 257/713; 116/47–49

(56) References Cited

U.S. PATENT DOCUMENTS

| | | | | |
|---|---|---|---|---|
| 4,774,434 A | * | 9/1988 | Bennion | 340/815.15 |
| 4,965,699 A | * | 10/1990 | Jorden et al. | 361/387 |
| 5,099,396 A | * | 3/1992 | Barz et al. | 361/387 |
| 5,223,747 A | * | 6/1993 | Tschlena | 257/713 |
| 5,430,612 A | * | 7/1995 | Simon et al. | 361/752 |
| 5,652,508 A | | 7/1997 | Yamamoto | 324/166 |
| 6,392,891 B1 | * | 5/2002 | Tzlil et al. | 361/719 |

FOREIGN PATENT DOCUMENTS

| | | |
|---|---|---|
| DE | 3736761 | 5/1989 |
| DE | 4343201 | 6/1995 |
| DE | 19623406 | 1/1998 |
| DE | 19651863 | 6/1998 |
| DE | 19819821 | 9/1999 |
| DE | 19819393 | 11/1999 |
| DE | 19835215 | 2/2000 |

OTHER PUBLICATIONS

Folie Als Umweltfreundliche Leiterplatten —Alternative. In : Elektronik Nov. 2000, p. 30.

* cited by examiner

*Primary Examiner*—Donnie L. Crosland
(74) *Attorney, Agent, or Firm*—Martin A. Farber

(57) ABSTRACT

A combination instrument (1) for displaying measured values and/or other information, having a flexible printed circuit (2) on which electrical and/or electronic components (9, 10, 13) are arranged, and with parts of the flexible printed circuit (2) being clamped in between a rear face cover (4) and a front face cover (3), with the rear face cover (4) to be made of metallic material.

15 Claims, 2 Drawing Sheets

COMBINATION INSTRUMENT FOR DISPLAYING MEASURED VALUES AND/OR OTHER INFORMATION, IN PARTICULAR FOR USE IN A MOTOR VEHICLE

FIELD AND BACKGROUND OF THE INVENTION

The invention relates to a combination instrument for displaying measured values or other information, in particular in a motor vehicle. Combination instruments such as these are used in order to inform the vehicle driver of the operating states of the motor vehicle, or to provide him with other information, for example, in the form of navigation instructions.

A combination instrument is known from the prior art, in which electrical and/or electronic components are arranged on a flexible printed circuit. In this case, parts of the flexible printed circuit are clamped in between a rear-face cover and a front-face cover.

One disadvantage of this is that thermal problems occur, in particular when using such a combination instrument in a motor vehicle and when using electrical and/or electronic components. Normally, when using printed circuits with electrical and/or electronic components, thermal problems are avoided by connecting the problematic components directly to heat sinks and/or by cooling them by means of a medium flowing over them, in particular air. Types of cooling such as these have the disadvantage that they are complex and occupy a large amount of space.

SUMMARY OF THE INVENTION

The object of the invention is thus to specify simple, space-saving cooling for the components.

This object is achieved in that the rear-face cover of the flexible printed circuit is made of a metallic material, in particular aluminum or copper. The invention makes use of the knowledge that the heat produced by the electrical and/or electronic components can be passed through the thin, flexible printed circuit to the rear-face cover, and that the metallic rear-face cover can be used for effective cooling. Even a large number of heat sources, such as lighting apparatuses and light-emitting diodes, can thus be arranged physically closely adjacent to one another on the flexible printed circuit without any additional further cooling devices. The rearward cover can, for example, be produced by stamping from an appropriate metal sheet.

If there are additional rearward covers, and parts of the flexible printed circuit are clamped in between the additional rearward covers the front cover, it is possible to arrange the visible display at different levels and/or angles by designing the front cover appropriately.

Arranging lighting means directly on the flexible printed circuit also makes it possible to dissipate the heat produced by them effectively via the rear-face cover. Using lighting means in the form of light-emitting diodes results in a permanent lighting apparatus for which no replacement capability or repair facility need to be provided, since, provided the current flow through them is appropriate, the light-emitting diodes have a longer life than the motor vehicle in which they are installed.

Openings in the front-face cover make it possible to arrange even relatively large components directly on the flexible printed circuit, and/or to arrange lighting means remotely from the item to be illuminated on the printed circuit.

Since the openings are surrounded by wall sections which are covered by subsections of an instrument dial, it is possible, for example, to use the light from lighting means for the respective subsections of the instrument dial, for example, in order to illuminate a specific pictogram, which has specific information content.

Since a measuring element is attached to the rear-face cover in such a manner that a part of the flexible printed circuit is arranged between the measuring element and the rear-face cover, it is possible to produce a simple electrical connection between the flexible printed circuit and the measuring element. For example, the measuring element may be screwed or clipped to the rear-face cover. A connection which is particularly simple to produce and, in the process can be produced permanently can be achieved by the measuring element having expanding dowels, which are passed through openings in the flexible printed circuit and in the rear-face cover and are then expanded, thus securing the measuring element.

The measuring element can be driven electrically in a simple manner by said measuring element having electrical connections which are connected to electrical contact surfaces on the flexible printed circuit. This can be done particularly easily if the connections of the measuring element are pressed onto the connections of the flexible printed circuit. If the connections of the measuring element are soldered to the contact surfaces of the flexible printed circuit, the electrical connections are particularly permanent, and are not susceptible to defects.

Since the measuring element has a pointer shaft composed of optically conductive material and the measuring element housing is designed in such a manner that it has an indentation underneath the pointer shaft toward the flexible printed circuit, an optically conductive pointer which is fitted on the pointer shaft can easily be illuminated by means of an illuminating device fitted within the incision on the flexible printed circuit.

If the flexible printed circuit is connected to a rigid printed circuit board, this makes it possible for the drive circuit for the components arranged on the flexible printed circuit to be produced in a space-saving manner on the rigid printed circuit board.

The rigid printed circuit board can be installed easily, permanently, and in a space-saving manner if it can be clipped in behind the rear cover.

BRIEF DESCRIPTION OF THE DRAWINGS

The invention will be explained in more detail in the following text with reference to a particularly preferred example. In the figures.

DETAILED DESCRIPTION OF THE PREFERRED EMBODIMENT

Figure 1:
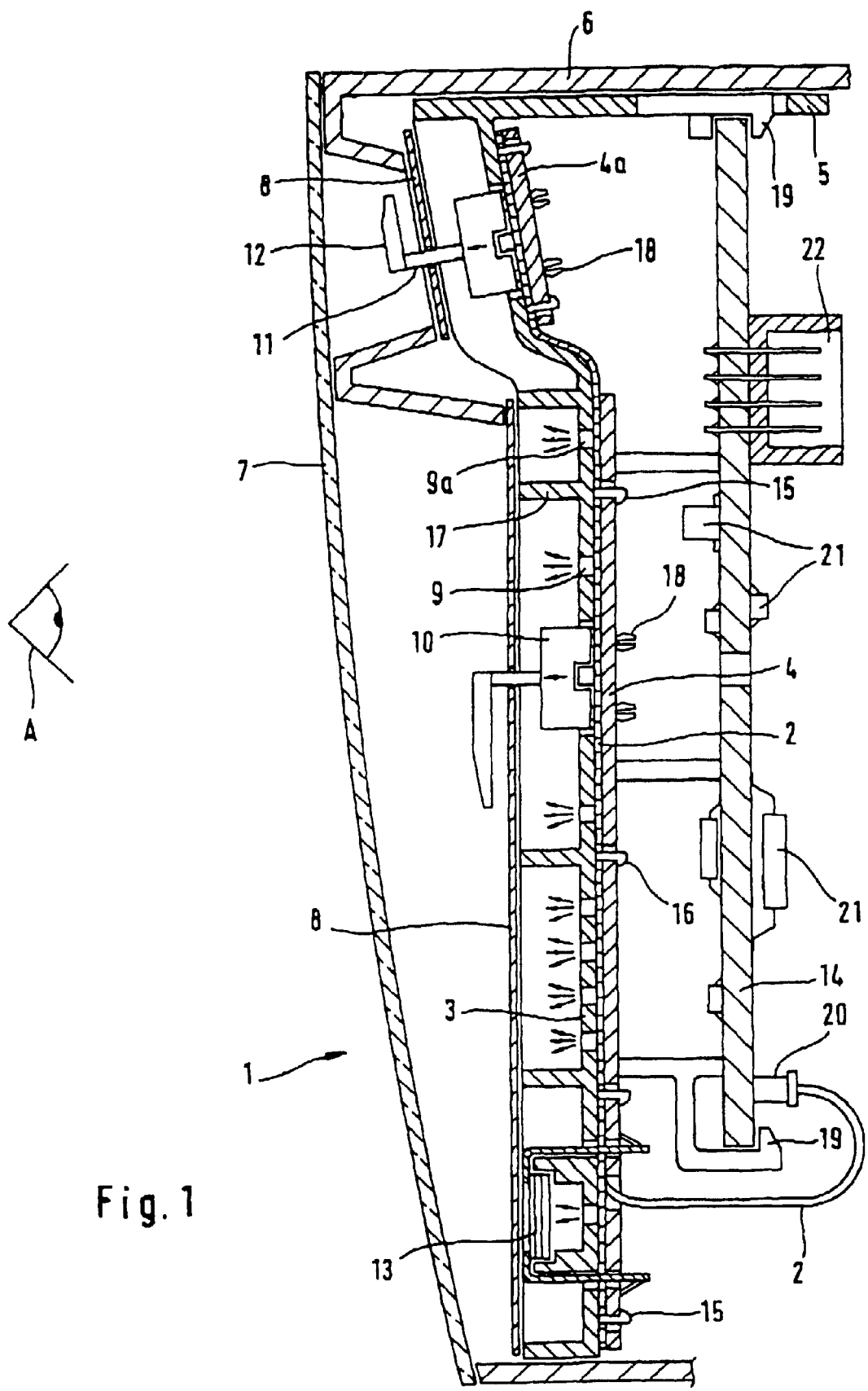
FIG. 1 shows a section through a particularly preferred combination instrument according to the invention, and the stylized eye of an observer.

FIG. 1 shows a section through a combination instrument 1 and the stylized eye A of an observer viewing the displays on the combination instrument 1. The combination instrument 1 has a flexible printed circuit 2, which is clamped in places between a front-face cover 3 and a rear-face cover 4. The front-face cover 3 in the exemplary embodiment is in the form of part of a system base 5. The illustration also shows a front frame 6, a transparent pane 7, instrument dials 8, 8a, light-emitting diodes 9, measuring elements 10 with pointer shafts 11, pointers 12, a liquid-crystal display 13 and a rigid printed circuit board 14 in the combination instrument 1. The rear-face covers 4, 4a are, according to the invention, made of metal, preferably of stamped sheet aluminum. Latching clips 15 are formed on the front-face cover, project through openings in the flexible printed circuit 2 and in the rear-face cover 4, 4a and have tabs 16 which press the rear-face cover 4, 4a against the front-face cover 3. The rear-face covers 4, 4a can thus be fitted quickly, easily and permanently simply by clipping on the rear-face covers 4, 4a. It is, of course, also possible, for example, to screw or to rivet the front-face cover 3 to the rear-face covers 4, 4a.

Since the rear-face cover 4 is pushed against the front-face cover 3 in the region alongside the light-emitting diodes 9, the flexible printed circuit 2 rests on the rear-face cover 4 in the region of the light-emitting diodes 9. The heat produced in the light-emitting diodes 9 can thus be dissipated effectively via the rear-face cover 4 since the flexible printed circuit 2 has only a low thermal resistance, because it is not very thick. The light-emitting diodes 9 are located in cutouts in the front-face cover 3, and their light beam can thus illuminate the instrument dials 8, 8a. The system base 5 has wall sections 17 which, for specific light-emitting diodes 9, for example for the illustrated light-emitting diode 9a, result in the light of the corresponding light-emitting diode 9a illuminating only a specific region of the instrument dial 8. The measuring element 10 is attached to the rear-face cover 4 such that it is pressed onto the flexible printed circuit 2. The housing of the measuring element 10 has an indentation, so that a light-emitting diode 9 can be arranged underneath the pointer shaft 11 on the printed circuit 2. The pointer shaft 11 is made of optically conductive material. Light from the light-emitting diode 9 can thus be injected into the pointer 12 via the pointer shaft 11. The measuring elements (10) may, for example, be in the form of quotient measuring elements or stepping motors.

The liquid-crystal display 13 may also be illuminated directly by a light-emitting diode 9. The rigid printed circuit board 14 is attached via second latching clips 19 on the system base 5, and is electrically conductively connected to the flexible printed circuit 2 via a zero-force connector 20. The connection can also be produced, for example, by using an iron to solder the flexible printed circuit to the rigid printed circuit board 14.

Electrical components 21 for driving the measuring elements 10, light-emitting diodes 9 and the liquid-crystal display 13 are arranged on the rigid printed circuit board 14. The rigid printed circuit board 14 also has a contact connector 22, via which the combination instrument 1 can be electrically connected to a motor vehicle, which is not shown.

Figure 2:
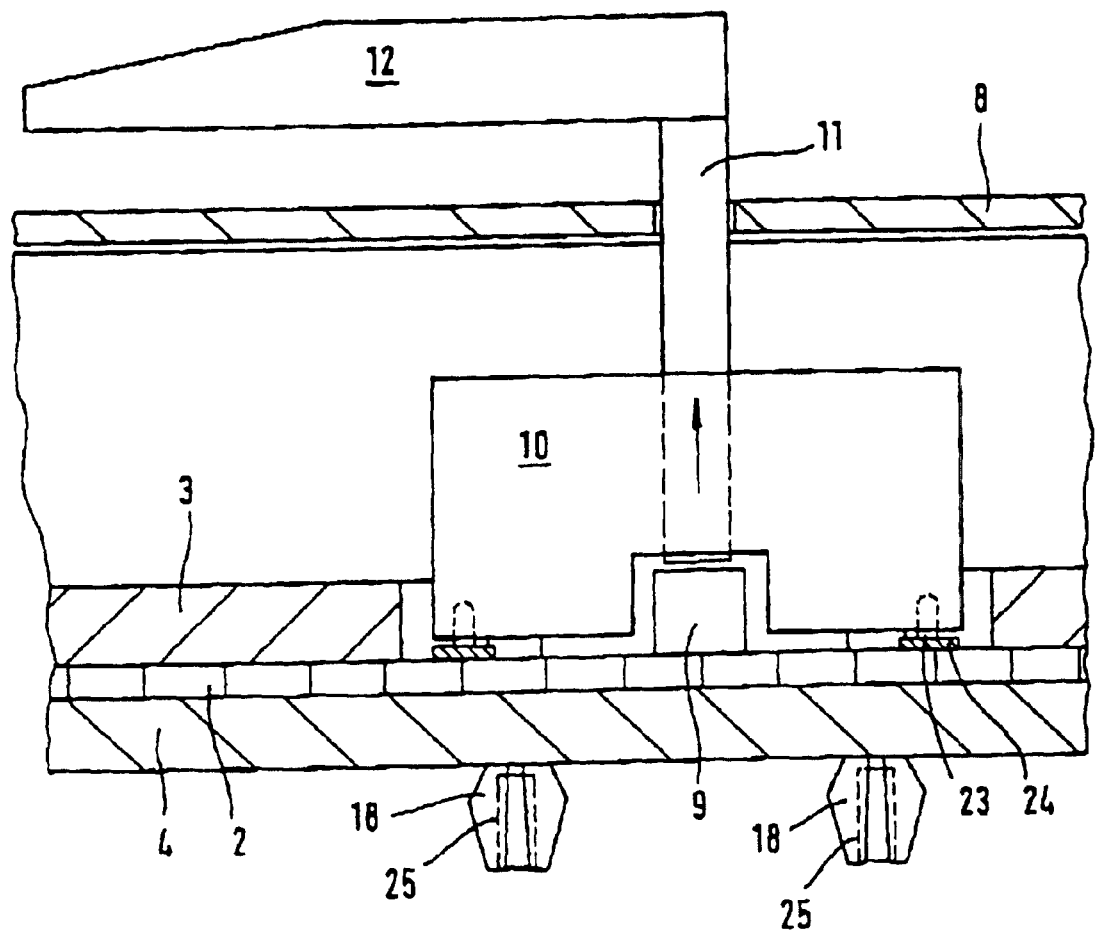
FIG. 2 shows a detail from FIG. 1, with a measuring element.

It can be seen from FIG. 2 that the measuring element 10 has electrical connections 23 which are pressed onto electrical contact surfaces 24 of the flexible printed circuit, so that the measuring elements 10 are electrically connected to the electrical components 21 via the flexible printed circuit 2 and via the rigid printed circuit board 14 illustrated in FIG. 1. It is also possible to solder the electrical connections 23 to the electrical contact surfaces 24. It can also be seen in FIG. 2 that the light-emitting diode 9 can inject its light into the pointer 12 via the pointer shaft 11. The expanding dowels 18 are designed to form part of the housing of the measuring element. The measuring element 10 can thus be attached by passing the expanding dowels through openings in the flexible printed circuit 2 and in the rear-face cover 4. Loosening of the expanding dowels 18 once they have been installed can effectively be prevented by means of locking pins 25, which are inserted into each of the expanding dowels 18.

We claim:

1. A combination instrument (1) for displaying measured values and/or other information, having a flexible printed circuit (2), on which electrical and/or electronic components (9, 10, 13) are arranged, with parts of the flexible printed circuit (2) being clamped in between a rear-face cover (4) and a front-face cover (3), wherein the rear-face cover (4) is made of metallic material.

2. The combination instrument as claimed in claim 1, wherein additional rearward covers (4a) are provided, and wherein the parts of the flexible printed circuit (2) are clamped in between the additional rear-face cover (4a) and the front cover (3).

3. The combination instrument as claimed in claim 1, wherein lighting means are arranged on the flexible printed circuit (2).

4. The combination instrument as claimed in claim 3, wherein the lighting means are in a form of light-emitting diodes (9).

5. The combination instrument as claimed in claim 1, wherein the front-face cover (3) has openings for accommodating the electrical and/or the electronic components (9, 10, 13).

6. The combination instrument as claimed in claim 5, wherein the openings are surroundable by wall sections (17), and wherein the wall sections (17) are covered by a part of an instrument dial (8) on a side opposite the openings.

7. The combination instrument as claimed in claim 1, wherein measuring elements (10) are attached to the rear-face cover (4) such that a part of the flexible printed circuit (2) is arranged between one of the measuring elements (10) and the rear-face cover (4).

8. The combination instrument as claimed in claim 7, wherein the measuring element (10) is attached to the rear-face cover (4) by expanding dowels (18).

9. The combination instrument as claimed in claim 7, wherein the measuring element (10) has electrical connections (23) via which the measuring element (10) is drivable, and wherein the electrical connections are electrically connected to contact surfaces on the flexible printed circuit (2).

10. The combination instrument as claimed in claim 9, wherein the electrical connections (23) of the measuring element (10) are pressed onto the electrical contact surfaces (24) on the flexible printed circuit (2), and an electrical contact is produced in this way.

11. The combination instrument as claimed in claim 9, wherein the connections (23) of the measuring element (10) are soldered to the electrical contact surfaces (24) on the printed circuit (2).

12. The combination instrument as claimed in claim 7, wherein the measuring element (10) has a pointer shaft (11) composed of optically conductive material, wherein a housing of the measuring element (10) is provided such that it has an indentation underneath the pointer shaft, and wherein a lighting device is arranged within the indentation on the printed circuit (2).

13. The combination instrument as claimed in claim 1, wherein the flexible printed circuit (2) is electrically conductively connected to a rigid printed circuit board (14), wherein further electronic components (21) are arranged on the rigid printed circuit board (14), and wherein the further electronic components (21) on the rigid printed circuit board

(14) drive the electrical and/or electronic components (9, 10, 13) which are arranged on the flexible printed circuit (2).

14. The combination instrument as claimed in claim 13, wherein the rigid printed circuit board (14) is arranged behind the rear cover (4).

15. The combination instrument as claimed in claim 14, wherein the front cover is part of a system base, and wherein the rigid printed circuit board is clippable into the system base (5) behind the rear cover (4).

* * * * *